United States Patent [19]

Girdwood

[11] Patent Number: 5,213,288
[45] Date of Patent: May 25, 1993

[54] PARACHUTE OPENING SHOCK REDUCING SYSTEM

[75] Inventor: Norman T. Girdwood, Durban, South Africa

[73] Assignee: Parachute Industries of Southern Africa (PTY) LTD, Sandton, South Africa

[21] Appl. No.: 805,067

[22] Filed: Dec. 11, 1991

[51] Int. Cl.⁵ .................................................. B64D 17/02
[52] U.S. Cl. ......................................... 244/145; 244/152
[58] Field of Search ................. 244/142, 145, 146, 152

[56] References Cited

U.S. PATENT DOCUMENTS

| | | | |
|---|---|---|---|
| 3,524,613 | 8/1970 | Reuter et al. | 244/142 |
| 3,749,337 | 7/1973 | Jalbert | 244/145 |
| 3,893,641 | 7/1975 | Sutton | 244/145 |
| 4,389,031 | 6/1983 | Whittington | 244/145 |
| 4,406,433 | 9/1983 | Rodkey et al. | 244/145 |
| 4,424,945 | 1/1984 | Dell | 244/142 |
| 4,930,727 | 6/1990 | Coe | 244/146 |
| 5,078,344 | 1/1992 | Buckley | 244/145 |

FOREIGN PATENT DOCUMENTS 2170156 7/1986 United Kingdom ................ 244/145

Primary Examiner—Galen Barefoot
Attorney, Agent, or Firm—Fitch, Even, Tabin & Flannery

[57] ABSTRACT

A high performance ram air canopy for a parachute comprises a fabric structure including a top fabric element and a bottom fabric element, these two elements being held in a spaced configuration by two side elements and a plurality of intermediate partition elements. The elements forming the fabric structure define a plurality of cells that extend rearwardly from an open, substantially linear, front face of the structure, with the canopy in its deployed configuration and the cells filled with air. A canopy of this type is exposed to an excessive opening shock upon deployment and this problem is overcome by reducing the rate at which the cells can be filled with air upon deployment.

22 Claims, 1 Drawing Sheet

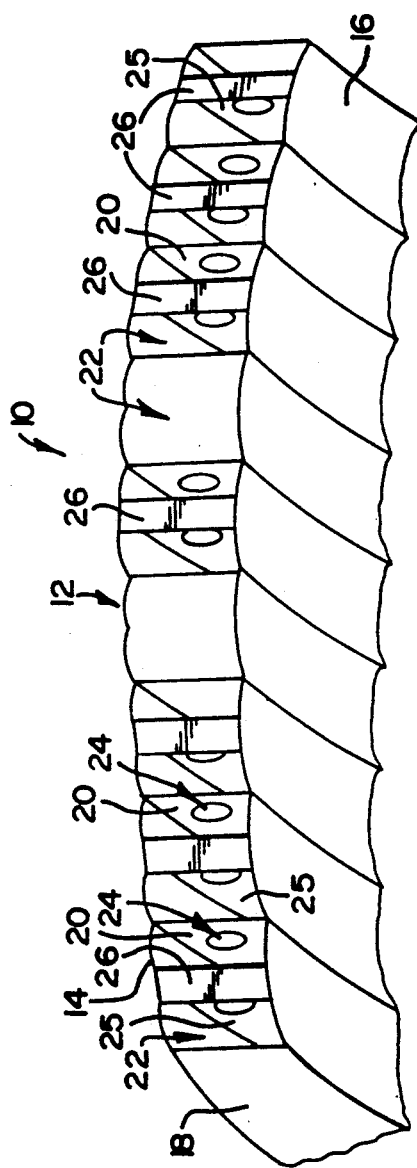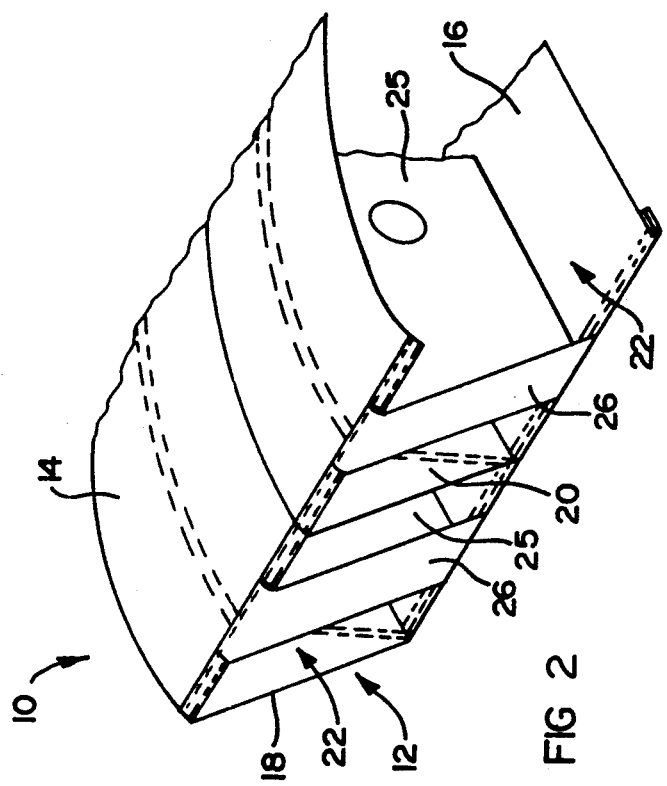

PARACHUTE OPENING SHOCK REDUCING SYSTEM

This invention relates to parachutes. More particularly, the invention relates to a high performance ram air canopy for a parachute and to a parachute including such a canopy.

Parachute canopies have been the subject of extensive developments, aimed at improving manoeuvrability, control, and other performance characteristics. A high performance ram air canopy of a parachute comprises a series of elongate, interconnected cells, defined by a suitable fabric material, that are filled with air during initial deployment of the canopy, the cells being disposed in a parallel adjacent configuration and providing the canopy with an angular profile in its fully deployed configuration and when viewed in plan view. In this configuration the canopy defines a substantially linear front face which is open, thus defining nose inlets which permit air to fill the said cells upon canopy deployment, the cells extending operatively rearwardly from the said front face. Furthermore, in this configuration, the canopy defines two side faces that are shorter than the front face, the canopy including further internal fabric partition elements disposed between a top and a bottom fabric element for defining and separating the said cells, apertures in the partition elements providing communication between adjacent cells to ensure an even air pressure within the cells of the canopy when deployed. A canopy of the above type conventionally has a linear rear edge substantially parallel to the front face of the canopy, but newer canopies have an angular rear edge terminating in a point. In side view, these canopies define an aerofoil profile, providing for air lift to act on a canopy during downward descent thereof.

The general configuration of parachute canopies of the above type is well known and, therefore, is not described in any further detail herein. One problem associated with known high performance ram air canopies relates to the use of high performance fabrics and new technology canopy profiles, known as wing planforms, the effective internal volumes of these canopies being reduced by shaping and the air filling time upon deployment of the canopies thereby being reduced, resulting in excessive opening shocks. It is an object of this invention to at least partially alleviate the above problem associated with known high performance ram air canopies.

Any reference hereinafter to a high performance ram air canopy must be interpreted as a reference to a canopy for a parachute of the above general type.

According to the invention there is provided a high performance ram air canopy for a parachute, the canopy comprising a fabric structure defining, in its deployed configuration, a substantially linear front face between a top fabric element and a bottom fabric element held in a spaced configuration by two side elements and a plurality of intermediate partition elements extending rearwardly from the front face at spaced intervals along the length thereof, the top and bottom fabric elements and the side and partition elements defining a plurality of cells between them that extend rearwardly from the said front face with the said front face defining a nose inlet for each cell through which air can enter the cell, the nose inlet of at least one cell being at least partially blocked-off by a blocking element.

It is anticipated that the nose inlet of more than one cell may be at least partially blocked-off by a blocking element and, particularly, that the nose inlet of all the cells may be at least partially blocked-off by blocking elements. Furthermore, the nose inlet of at least one cell may be fully blocked-off by a blocking element and, as such, the nose inlets of some cells may be fully blocked-off and of other cells may be partially blocked-off, by blocking elements.

The blocking element for each cell at least partially blocked-off comprises a fabric baffle element secured to elements forming the canopy in the front face region thereof. Each baffle element may be secured to extend between the top and bottom fabric elements of the fabric structure forming the canopy. Particularly, each baffle element may be a rectangular element secured centrally between opposite sides of its nose inlet, the width of the element determining the extent to which the nose inlet is blocked-off.

The number of nose inlets at least partially blocked-off and the degree of blocking-off may be determined by the particular type canopy, as well as acceptable shock characteristics of the canopy upon canopy deployment. This aspect of the invention therefore is greatly variable and, particularly, will vary for different design high performance ram air canopies.

The elements separating cells of the ram air canopy may be apertured to provide air communication between cells, thus ensuring that the air pressure within the separate cells after deployment of the canopy remains equal. Individual cells of the canopy may have auxiliary intermediate partition elements secured between the top and bottom fabric elements, the said auxiliary elements being apertured to ensure an even air pressure in these cells.

The invention extends also to a parachute comprising a high performance ram air canopy, a harness for harnessing the parachute to a person's body and control means for controlling the operation of the parachute, the ram air canopy comprising a fabric structure defining, in its deployed configuration, a substantially linear front face between a top fabric element and a bottom fabric element held in a spaced configuration by two side elements and a plurality of intermediate partition elements extending rearwardly from the front face at spaced intervals along the length thereof, the top and bottom fabric elements and the side and partition elements defining a plurality of cells between them that extend rearwardly from the said front face with the said front face defining a nose inlet for each cell through which air can enter the cell, the nose inlet of at least one cell being at least partially blocked-off by a blocking element.

The harness for harnessing the parachute to a person's body and the control means for controlling the operation of the parachute may be conventional as for known parachutes of the type. Furthermore, the ram air canopy may include all the further features of the ram air canopy in accordance with the present invention and as defined hereinabove.

By providing for blocking-off and/or partial blocking-off of one or more nose inlets of the cells of a ram air canopy, an increased air filling time of the canopy during deployment is provided for and, as a result, the opening shock characteristics of the ram air canopy are improved, whilst at the same time the high performance characteristics of the canopy are not affected. Complete and/or partial blocking-off of the nose inlets of the cells of a ram air canopy may be effected in many different configurations using different shape and configuration fabric or other material baffle elements, it also being anticipated that the degree of blocking-off of nose inlets may be adjustable in order to accommodate different conditions and requirements.

The invention is now described, by way of an example, with reference to the accompanying diagrammatic drawings, in which:

FIG. 1 shows a front view of a part of a high performance ram air canopy for a parachute, in accordance with the invention; and FIG. 2 shows a three-dimensional detailed view of a portion of the part of the canopy of FIG. 1.

Referring to the drawings, a high performance ram air canopy for a parachute, in accordance with the invention, is designated generally by the reference numeral 10. The overall outward shape and configuration of the canopy 10 is conventional and, as such, the canopy may have a conventional linear rear edge, or any other rear edge profile, the overall shape and configuration of such a canopy being well known and, therefore, not being described or illustrated in further detail herein.

Being of the abovementioned general shape and configuration, the canopy has a substantially linear front face 12, which is open, and which is defined between a top fabric element 14 and a bottom fabric element 16, the fabric elements 14 and 16 being connected to one another by two fabric side elements 18 and a plurality of fabric partition elements 20. The side elements 18 and partition elements 20 define an aerofoil profile when viewed in side view, thus providing the canopy 10 with a required aerofoil profile when viewed in side view and when in its fully deployed configuration filled with air.

The side elements 18 and partition elements 20 divide the canopy into a plurality of elongate cells 22 extending operatively rearwardly from the front face 12 of the canopy 10, the said open front face 12 thus providing nose inlets which permit the cells 22 to be filled with air upon deployment of the canopy. The particular canopy 10 as shown includes nine separate cells, the partition elements 20 between adjacent cells having apertures 24 provided therein, which provide for communication between adjacent cells and, therefore, equal air pressure within the entire canopy 10 in its deployed configuration. For the particular configuration canopy shown, the individual cells 22 have auxiliary intermediate partition elements 25 secured between the top fabric element 14 and bottom fabric element 16. These elements 25 ensure that the cells 22 define the required cross-sectional profile when filled with air, apertures in the elements 25 ensuring equal air pressure within the cells 22.

The above construction of the canopy 10 as described is conventional for known high performance ram air canopies and is not described further herein.

The canopy 10 is manufactured of a high performance fabric and with its new technology profile or planform as shown, the internal volume of the canopy has been reduced through its shaping, making it necessary to reduce the nose inlet area of the cells 22 in a corresponding manner in order to increase the filling time of the cells 22 with air and thus improve the opening shock characteristics of the canopy. In order to accommodate this, and in the particular configuration shown, seven of the nose inlets associated with cells 22 of the canopy 10 have fabric baffle elements 26 secured between the top fabric element 14 and bottom fabric element 16 as shown, the baffle elements 26 clearly restricting the size of the nose inlets and, thereby, restricting the rate at which air can enter the cells upon canopy deployment and thereby providing for the required increase in air filling time.

The baffle elements 26 are rectangular elements and are secured in a central location between opposite sides of the respective cells, the width of the baffle elements determining the reduction in nose inlet size and thus determining the rate at which air can flow into the cells. The width of the baffle elements can be varied for different canopies in order to comply with different requirements and canopy characteristics.

Furthermore, because of the location of the baffle elements 26, the front face profile of the canopy and particularly the nose inlet profile of the individual cells 22 are controlled, ensuring efficient air intake into the cells at all times during canopy deployment.

It is also anticipated that different cells of a canopy may be provided with baffle elements or that all cells of a canopy may be provided with baffle elements, a further possibility being that some of the nose inlets leading into cells can be completely blocked-off. In this way, different opening characteristics can be provided for in order to suit particular parachute canopies By way of example and referring to FIG. 1 of the drawings, the nose inlets of the cells 22.1 may either be fully open, or alternatively, fully blocked-off.

By the partial closure of at least some of the nose inlets leading into canopy cells, the filling time upon deployment of the canopy is significantly increased, thereby reducing the opening shock that occurs as a result of canopy deployment, excessive shock being associated with canopies of the high performance ram air type because of the novel wing planforms, which improve parachute performance characteristics, but not deployment characteristics.

The invention extends also to a parachute including a canopy as is hereinabove described, the parachute including further a harness for harnessing the parachute on to the body of a person and control means for controlling operation of the parachute. The said harness and control means may be conventional as for known parachutes of the type.

I claim:

1. A high performance air canopy for a parachute, the canopy comprising a fabric structure defining, in its deployed configuration, a substantially uniformly cross sectioned front face between a top fabric element and a bottom fabric element held in spaced configuration by two side elements and a plurality of intermediate partition elements extending rearwardly from the said front face at spaced intervals along the length thereof, the top and bottom fabric elements and the side and partition elements defining a plurality of cells between them that extend rearwardly from the said front face with the said front face defining a nose inlet for each cell through which air can enter the cell, the nose inlet of at least one cell being at least partially blocked-off by a blocking element to a degree sufficient to significantly restrict the rate at which air enters the canopy, with the nose inlets of at least two cells spaced from the center of the canopy not being wholly blocked off when the canopy is in its deployed configuration.

2. A high performance ram air canopy as claimed in claim 1, in which the nose inlet of more than one cell is at least partially blocked-off by a blocking element.

3. A high performance ram air canopy as claimed in claim 2, in which the nose inlet of all the cells are at least partially blocked-off by blocking elements.

4. A high performance ram air canopy as claimed in claim 1, in which the nose inlet of at least one cell is fully blocked-off by a blocking element.

5. A high performance ram air canopy as claimed in claim 4, in which the nose inlets of some cells are fully blocked-off and of other cells are partially blocked-off by blocking elements.

6. A high performance ram air canopy as claimed in claim 1, in which the blocking element for each cell at least partially blocked-off comprises a fabric baffle element secured to elements forming the canopy in the front face region thereof.

7. A high performance ram air canopy as claimed in claim 6, in which each baffle element is secured to extend between the top and bottom fabric elements of the fabric structure forming the canopy.

8. A high performance ram air canopy as claimed in claim 7, in which each baffle element is a rectangular element secured centrally between opposite sides of its nose inlet, the width of the element determining the extent to which the nose inlet is blocked-off.

9. A high performance ram air canopy as claimed in claim 1, in which the number of nose inlets at least partially blocked-off and the degree of blocking-off are determined by the particular type canopy and acceptable opening shock characteristics of the canopy upon canopy deployment.

10. A high performance ram air canopy, as claimed in claim 1, in which the elements separating cells of the ram air canopy are apertured to provide air communication between cells.

11. A high performance ram air canopy as claimed in claim 1, in which individual cells have auxiliary intermediate partition elements secured between the top and bottom fabric elements, the said auxiliary intermediate partition elements having apertures formed therein.

12. A parachute comprising a high performance ram air canopy, a harness for harnessing the parachute to a person's body and control means for controlling the operation of the parachute, the ram air canopy comprising a fabric structure defining, in its deployed configuration, a substantially uniformly cross sectioned front face between a top fabric element and a bottom fabric element held in spaced configuration by two side elements and a plurality of intermediate partition elements extending rearwardly from the said front face at spaced intervals along the length thereof, the top and bottom fabric elements and the side and partition elements defining a plurality of cells between them that extend rearwardly from the said front face with the said front face defining a nose inlet for each cell through which air can enter the cell, the nose inlet of at least one cell being at least partially blocked-off by a blocking element to a degree sufficient to significantly restrict the rate at which air enters the canopy, with the nose inlets of at least two cells spaced from the center of the canopy not being wholly blocked off when the canopy is in its deployed configuration.

13. A parachute as claimed in claim 12, in which the nose inlet of more than one cell of the ram air canopy is at least partially blocked-off by a blocking element.

14. A parachute as claimed in claim 13, in which the nose inlet of all the cells of the ram air canopy are at least partially blocked-off by blocking elements.

15. A parachute as claimed in claim 12, in which the nose inlet of at least one cell of the ram air canopy is fully blocked-off by a blocking element.

16. A parachute as claimed in claim 15, in which the nose inlets of some cells of the ram air canopy are fully blocked-off and of other cells are partially blocked-off by blocking elements.

17. A parachute as claimed in claim 12, in which the blocking element for each cell of the ram air canopy at least partially blocked-off comprises a fabric baffle element secured to elements forming the canopy in the front face region thereof.

18. A parachute as claimed in claim 17, in which each baffle element is secured to extend between the top and bottom fabric elements of the fabric structure forming the ram air canopy.

19. A parachute as claimed in claim 18, in which each baffle element is a rectangular element secured centrally between opposite sides of its nose inlet, the width of the element determining the extent to which the nose inlet is blocked-off.

20. A parachute as claimed in claim 12, in which the number of nose inlets of the ram air canopy at least partially blocked-off and the degree of blocking-off are determined by the particular type canopy and acceptable opening shock characteristics of the canopy upon canopy deployment.

21. A parachute as claimed in claim 12, in which the elements separating cells of the ram air canopy are apertured to provide air communication between cells.

22. A parachute as claimed in claim 12, in which individual cells of the canopy have auxiliary intermediate partition elements secured between the top and bottom fabric elements thereof, the said auxiliary intermediate partition elements having apertures formed therein.

* * * * *